June 30, 1964 J. R. MUIR 3,138,973
CHAIN SAW WITH SHARPENING MEANS
Filed April 2, 1962 2 Sheets-Sheet 1

John R. Muir,
INVENTOR.
WHANN & McMANIGAL
Attorneys for Applicant

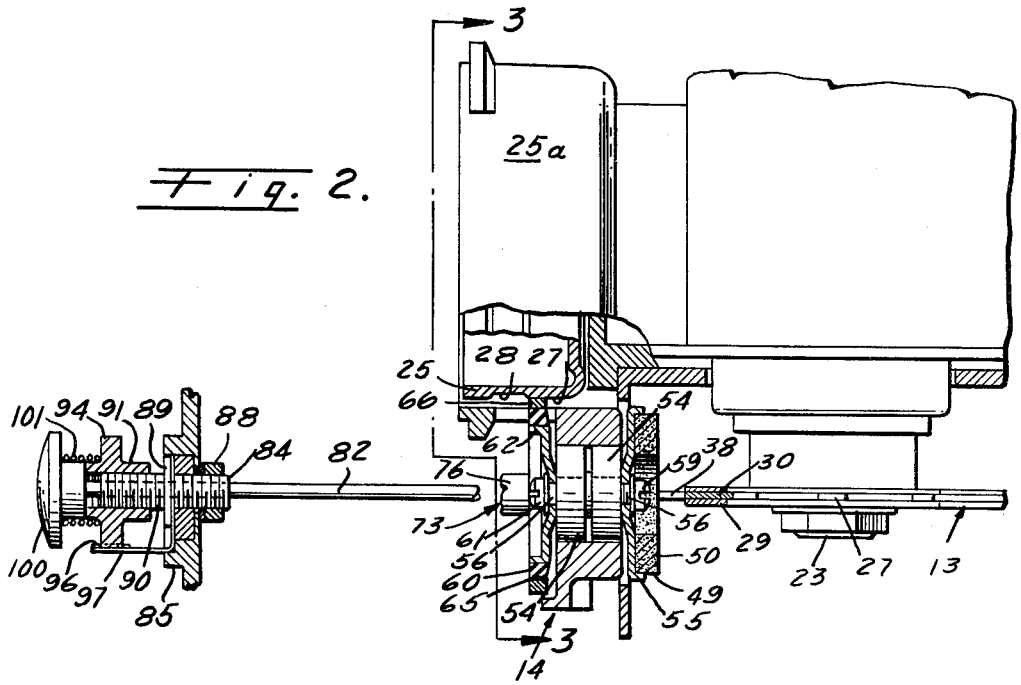
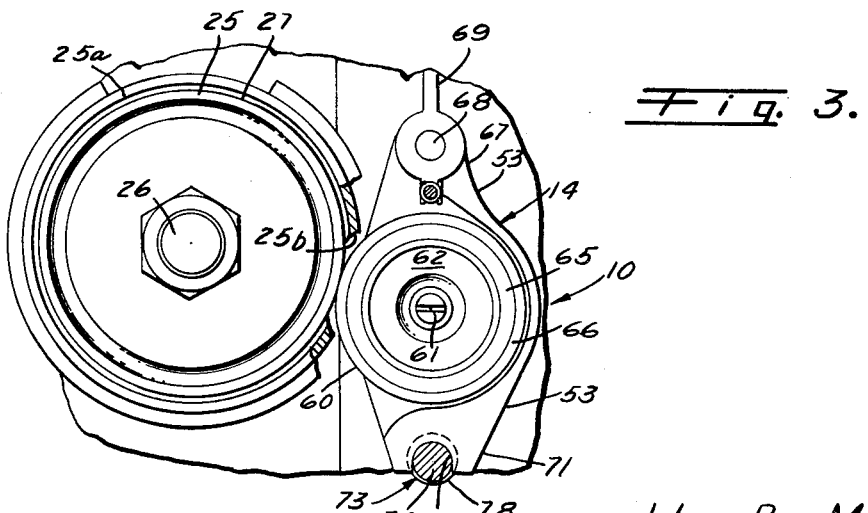

United States Patent Office 3,138,973
Patented June 30, 1964

3,138,973
CHAIN SAW WITH SHARPENING MEANS
John R. Muir, Gardena, Calif., assignor to McCulloch Corporation, Los Angeles, Calif., a corporation of Wisconsin
Filed Apr. 2, 1962, Ser. No. 184,007
5 Claims. (Cl. 76—37)

This invention relates to means for sharpening saw chains, and, more particularly, to sharpening means on a chain saw for sharpening the cutters on the saw chain during cutting operations.

It is an object of the invention to provide an improved means for sharpening saw chains.

It is another object of the invention to provide means to sharpen saw chains accurately and efficiently and, in general, to obtain better sharpening results than were heretofore possible.

It is still another object of the invention to provide sharpening means for saw chains that maintain the cutting elements in their optimum sharpened conditions.

It is a further object of the invention to provide means to sharpen the cutting elements of the saw chain and to correspondingly accurately reduce the length of the depth gauges on the chain while sharpening during cutting operations.

It is a still further object of the invention to provide sharpening means for a saw chain to sharpen the cutting edges more accurately than can be done by using a file. That is, the present invention permits an unskilled operator to obtain better sharpening results than can be obtained by an expert tool maker using a file or a grinding wheel not on the chain saw.

It is another object of the invention to provide a sharpening means on a chain saw which will sharpen the saw chain cutting elements and reduce the length of depth gauges that are much harder than file hardness. By making the cutting elements and depth gauges harder than those that could be sharpened with a file, the life of the saw chain is greatly prolonged.

It is still another object of the invention to provide a whetting member on a chain saw which is dressed automatically during the sharpening operation and which does not require typical stone dressing.

It is a further object of the invention to provide a sharpening means for chain saws to be used in cooperation with a drive mechanism and chain which functions to hold the chain in a constant radial position so that the cutting elements all pass through the same position of an arc and thereby be sharpened the proper amount by a grinding wheel movable into tangency at said position on the arc.

It is a still further object of the invention to provide on a chain saw engine frame a grinding wheel which can be moved from a non-sharpening position to a sharpening position where its sharpening surface is on a point of an arc on which the cutting edges and the outer surfaces of the depth gauges travel.

It is another object of the invention to provide a grinding wheel on a chain saw engine whereby the wheel is rotatable in sharpening contact on the saw chain in a path perpendicular to the path of the saw chain.

It is still another object of the invention to provide a sharpening means on a chain saw engine for sharpening cutting elements of the saw chain during cutting operations, said cutting elements being of different lengths.

Further objects and advantages of the invention may be brought out in the following part of the specification, wherein small details have been described for the competence of disclosure, without intending to limit the scope of the invention which is set forth in the appended claims.

Referring to the accompanying drawings, which are for illustrative purposes only:

FIG. 2 is a fragmentary, partially cross sectional plan view of the chain saw in FIG. 1; and FIG. 3 is a fragmentary end view taken as indicated by the line 3—3 of FIG. 2.

Figure 1:
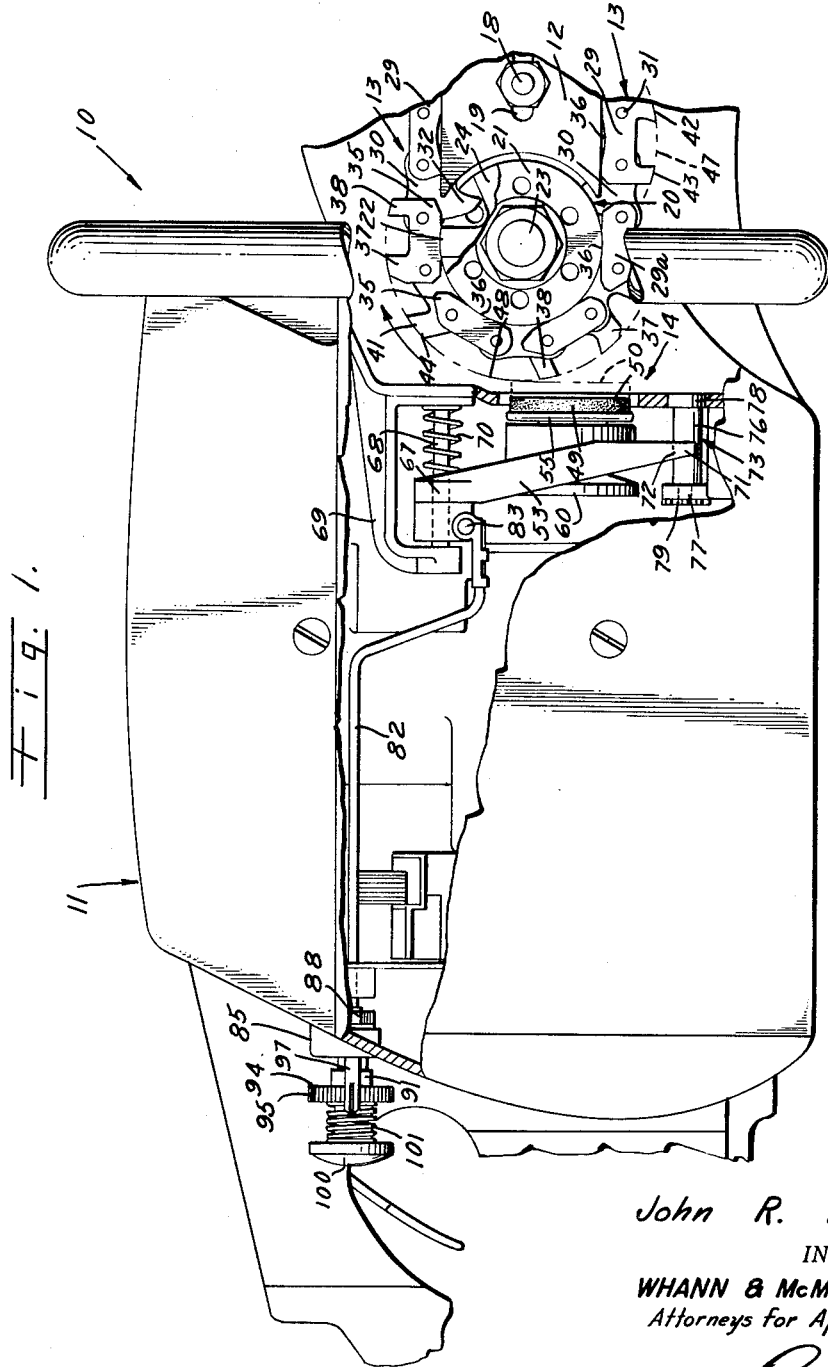
FIG. 1 is a fragmentary, partially cut away side elevational view of a chain saw having the present invention.

Referring again to the drawings, there is illustrated a chain saw, manufactured by McCulloch Corporation, generally designated as 10, having an engine frame portion 11, a bar or blade 12, a saw chain 13 which is driven by the engine and which travels on the bar, and a sharpening mechanism, designated generally as 14, secured on the engine frame.

The bar 12 is adjustably secured to the engine frame 11 by bolts 18 on the frame extending through a slot 19 in the bar. The bar is of the grooved type having an unshown groove extending around its peripheral edges outwardly of the engine frame.

The chain is driven on the bar by a sprocket assembly, generally designated as 20, secured to engine driving shaft 23. The sprocket assembly is comprised of two axially aligned discs 21 spaced by a sprocket 22 sandwiched therebetween having teeth 24.

As shown in FIGS. 2 and 3, there is a chain saw engine clutch drum 25, mounted for rotation within an enlarged diameter cylindrical engine frame portion 25a, which has an opening 25b in its cylindrical wall to expose outer circumferential surface 27 of the drum and an annular groove 28 therein. The driving shaft 23 is driven by the clutch drum, having a shaft 26 in a geared relationship with shaft 23 so as to drive the latter. The clutch drum is caused to rotate when it is properly engaged in a conventional manner with the unshown drive shaft of the chain saw engine.

As shown in FIGS. 1 and 2, the endless saw chain includes side links 29 and center links 30 connected consecutively by pintles 31. Extending inwardly of the chain on the center links 30 are sprocket-engaging projections or tangs 32 adapted to ride in the groove of the bar 12 and to fit in the pockets between the teeth 24 of the sprocket 22.

On the inner surfaces of the forward ends of side and center links are extensions 35 disposed longitudinally forwardly of the pintles and the tangs 32. Each extension 35 is limited longitudinally to permit clearance with the trailing portion of the next link forwardly and contacts the outer circumferential surfaces of the sprocket teeth or the discs 21, depending upon whether it is a center or side link, as the chain moves from the lower portion of the bar to engage the sprocket assembly. It should be noted that the contacts of the extensions with the circumferential surfaces of the sprocket teeth and discs occur before the extensions reach the vertical diameter through the sprocket assembly and which is substantially perpendicular to the path of the chain at the point where the line of direction of the chain would form a tangent at the lowest point on the sprocket assembly. The contact of the extensions 35 on the lower circumferential surfaces of the sprocket assembly limits the vertical movement of the side and center links on the sprocket so as to provide a smooth and constant positioning of the chain on the sprocket and to properly position the cutting elements for sharpening. By having the chain enter engagement with the sprocket in this manner, teetering on meshing is prevented and the wear which occurs as the result of teetering in a conventional chain between the frictionally engaging parts is also limited.

To further aid in properly positioning the chain radially on the sprocket assembly, each side link 29 has a longitudinally arced, inwardly facing surface 36. The arced surfaces 36 have the same radii as the discs 21 and the sprocket wheel 22 and when the side links move onto the sprocket to the position shown by the link 29a at the lower portion of the sprocket in FIG. 1, the center of the arcs 36 and the center of the sprocket assembly 20 become coincident, and the surfaces 36 riding on the circumferential surfaces of the discs 21 so as to maintain the chain links concentric after the initial meshing with the sprocket assembly in a constant radial position with non-teetering movement. Since the chain on the sprocket assembly remains in a constant radial position after the first tooth 29a is engaged, there is no vibration and little wear in the chain and sprocket so as to thereby provide a very smooth running chain.

As shown in FIG. 1, side cutter elements 37 extend vertically outwardly from selected side links, and spaced forwardly thereon are depth gauges 38. Similarly, on selected center links are center cutting elements 41.

The outer surfaces 42 of the side cutting elements 37, the outer surfaces 43 of the depth gauges 38, and the outer surfaces 44 of the center cutting elements 41 are curved and lie on arcs 47, shown in the lower portion of the chain in FIG. 1, of equal radii, the centers of which are on an unshown line, perpendicular to the horizontal center plane through the pintles, and extending midway between the axis of each pair of pintles 31 so that the vertical distance to the outer surfaces of the cutting elements and depth gauges from the horizontal plane is determined by the longitudinal distance from the aforesaid unshown line and the axes of the pintles. In other words, for example, the outer surfaces 42 at the cutting edges of the side cutters are the same vertical distance from the horizontal plane through the pintles and, therefore, are the same horizontal distance from the axes of the respective pintles of the selected side links. Similarly, depth gauges 38 are shown to be shorter than the side cutters 37, and, therefore, have their outermost point on the arc 47 nearer to an axle of a pintle than do the side cutters 37. In the embodiment shown, the center cutters 41 are of the same vertical length as the side cutters.

The particular arrangement of the cutting edges and depth gauges, all being on arcs 47 having equal radii, and when rotated on the sprocket assembly are maintained in a constant radial position, having their outer surfaces 42, 43 and 44 on an arc 48 whose center is at the center of the arcs 47 and the center of the sprocket assembly 20. This makes it possible to sharpen the chain with a grinding wheel 49 of the sharpening mechanism 14 as each outer surface of each cutter and depth gauge contacts the surface 50 of the grinding wheel at the same distance from the center of the arcs 47 and 48. This provides a much better way of sharpening than the use of an individual file, both in regard to speed and to accuracy. In addition, it permits the cutting teeth and depth gauges to be made harder than they can be made when the sharpening must be accomplished by a file in the conventional manner.

As shown in FIGS. 1, 2 and 3, whetting wheel 49 of the sharpener mechanism 14 is supported for rotation in a one-piece holder 53 by means of two ball bearings 54 centrally disposed therein.

The grinding wheel 49 is fitted in a shallow cup 55 and extending centrally therethrough is a grinding wheel shaft 56, fitted to rotate within the inner race of the ball bearings 54. The cup 55 is secured to the shaft by means of a cap screw 59. At the other end of the shaft 56, opposite the grinding wheel, is a driving wheel 60, secured thereto by a cap screw 61. The wheel 60 has an inner disc portion 62 surrounded by an elastomeric ring 65 which is in turn surrounded by a metallic outer ring 66, the ring 65 being bonded to the outer ring and to the inner disc.

Extending through an opening in upper end 67 of holder 53 is a support rod 68, shown in FIG. 1, which is secured by a bracket 69 fixed to the engine frame. The holder 53 is slidably engaged on the rod 68 and is biased by a coil spring 70 on the rod 68 so as to be held away from the chain and sprocket assembly in the full line position shown in FIG. 1.

At the lower end 71 of the holder 53 is an inverted U-shaped recess 72, shown in FIG. 3. The recess 72 is fitted over a camming member, generally designated as 73, comprised of an elongated central cylindrical member 76 fitted to rotate off center and held in position by end members 77 and 78 which are mounted in the engine frame to rotate on center by means of adjustment disc 79. Thus, when the disc 79 is rotated, the off center member 76 pivots the holder 53 on the rod 68 by moving the lower end 71 either to the left or the right, as may be seen in FIG. 3.

An actuating rod 82 is pivotally engaged at its inner end to the upper end 67 of the holder at 83 so that longitudinal movement of the rod 82 will slide the holder on its support rod 68. The rod 82 is supported by and slidably engaged in a sleeve 84 secured to the engine frame in a boss 85 by means of a nut 88 and a threaded washer 89 threadedly engaged with external threads 90 on the sleeve, the nut and washer being on opposite sides of the engine frame structure. Also threadedly engaged, outwardly of the engine frame, on the threads 90 is a sleeve 91 having an annular flange 94 with a serrated circumferential surface 95. The sleeve 91 is held against rotation on the sleeve 84 by a projection 96 extending inwardly from an adjustment stop member 97 secured to the engine frame by the washer 89, the projection 96 being in alignment to fit in any one of the serrations 95. On the outer end of rod 82 is a flanged knob 100 biased from the flange 94 by means of a coil spring 101.

As may be seen in FIGS. 2 and 3, the opening 25b in frame member 25a is in radial alignment with the driving wheel 60 and the latter is spaced radially from the circumferential groove 28 when the grinding wheel 49 is in its non-rotating and non-sharpening position, shown in full lines in FIG. 1. When the grinding wheel is in its sharpening position, as in FIG. 2, the driving wheel 60 is radially outwardly of and in contact with drum surface 27, and when in the latter position, it and the grinding wheel rotate whenever the saw chain 13 is driven by the clutch drum and the shafts 26 and 23.

As can be seen in FIG. 3, the axes of the clutch drum, of the shaft 56, and of the wheels 60 and 49 are parallel so that the wheel 60 can be easily pivoted into proper contact with the clutch drum surface 27 by the rotation of the adjusting disc 79 of the camming member 73. In this regard, it should be noted that the elastomeric ring 65 gives the driving wheel flexibility so that it can accommodate any eccentricity of the clutch drum. Further, the driving wheel 60, because of the elastomeric material therein, can be tightened against the clutch drum to provide a better frictional contact between the two than would be otherwise possible without the flexibility provided by the said material. Another advantage provided by the elastomeric material in the driving wheel 60 is that it permits the wheel to run cooler and there is less tendency of it to fly apart when running up against an eccentric surface of a warped clutch drum.

To sharpen the cutting elements of the saw chain 13 and to correspondingly grind down the depth gauges, the driving shaft 23 must be driving the sprocket assembly 20 so as to move the saw chain over its regular path on the saw bar 12 and the sharpening may be accomplished whether the saw chain is merely idling or is actually cutting. In FIG. 2, the grinding wheel 49 has been moved to the right from the position of the full line figure in FIG. 1 to that of the broken line configuration so that the grinding surface 50 is tangent to the arc 48 and, thus, in position to contact the outer surfaces 42, 43 and 44 of the side cutters, depth gauges and center cutters, respectively. To move the grinding wheel into the sharpening position shown in FIG. 2, the actuating rod 82 and the knob 100 are moved to the right from the position shown in FIG. 1 so that the knob moves against the bias of spring 101 and into contact with the stopping sleeve 91, said contact limiting the amount of movement of the grinding wheel relative to its sharpening position. This amount of movement determines the radius of the arc 48 or, in other words, the amount of grinding and sharpening that is to occur on the depth gauges and cutting elements, respectively. The amount of movement of the grinding wheel to the right is determined by the position of the stopping sleeve 91 and which is changed by rotating it on the threads 90 of the sleeve 84. The sleeve 91 is held in a position of adjustment by the projection 96 on the member 97, the projection fitting into the proper serration 95. The space between the serrations can be calibrated relative to the axial movement of the sleeve 90 on the sleeve 84 so that the rotation of the serrations relative to the projections 96 and into locking engagement therewith provides a predetermined amount of movement of the grinding wheel to the right and a consequent predetermined amount of grinding off the saw chain.

When a sharpening operation has been completed, and this occurs in a very short period, the knob 100 is released by the operator and the spring 70, as well as the spring 101, moves the grinding wheel 49 to the left and out of contact with the saw chain and also moves the wheel 60 out of contact with the drum surface 27.

An advantage of having the grinding surface 50 perpendicular to the path of the saw chain is that the chain dresses the grinding surface automatically and, thus, the surface 50 does not require stone dressing.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. In a chain saw of the type having an endless saw chain driven by an engine, said engine supported in a housing; means supported on the housing to sharpen the cutting edges of the cutters on the saw chain in its path of travel during normal engine and sawing operation, said means to sharpen comprising:
   (a) a member slidably supported adjacent said housing;
   (b) a grinding wheel on a shaft bearing mounted on said member and rotatable in a path perpendicular to the path of the cutters,
   (c) said member being slidably movable so that said grinding wheel is movable into and out of sharpening contact with said cutting edges of said cutters,
   (d) said sharpening contact being made on a point of arc through which each cutting edge passes;
   (e) means on said chain saw adjacent said housing to slidably move said member so as to place said grinding wheel in sharpening contact with said cutting edges;
   (f) spring means on said last means to bias said grinding wheel out of sharpening contact with said cutting edges;
   (g) and a driving wheel on said shaft driven by contact with means on said engine to rotate said grinding wheel to sharpen said cutting edges,
   (h) said member being pivotable to adjust said driving wheel relative to said last means on said engine to insure proper rotation of said grinding wheel.

2. In a chain saw of the type having an endless saw chain driven by an engine, said engine supported in a housing; means supported on the housing to sharpen the cutting edges of the cutters on the saw chain in its path of travel during normal engine and sawing operation, said means to sharpen comprising:
   (a) a member slidably supported adjacent said housing;
   (b) a grinding wheel on a shaft bearing mounted on said member and rotatable in a path perpendicular to the path of the cutters,
   (c) said member being slidably movable so that said grinding wheel is movable into and out of sharpening contact with said cutting edges of said cutters,
   (d) said sharpening contact being made on a point of arc through which each cutting edge passes;
   (e) means on said chain saw adjacent said housing to slidably move said member so as to place said grinding wheel in sharpening contact with said cutting edges;
   (f) spring means on said last means to bias said grinding wheel out of sharpening contact with said cutting edges;
   (g) and a driving wheel on said shaft driven by contact with means on said engine to rotate said grinding wheel when it is in said sharpening contact to sharpen said cutting edges,
   (h) said member being pivotable to adjust said driving wheel relative to said last means on said engine to insure proper rotation of said grinding wheel,
   (i) said driving wheel being slidable with said member to be spaced from said last means when said spring means biases said grinding wheel out of said sharpening contact.

3. In a chain saw of the type having an endless saw chain driven by an engine, said engine supported in a housing; means supported on the housing to sharpen the cutting edges of the cutters on the saw chain in its path of travel during normal engine and sawing operation, said means to sharpen comprising:
   (a) a member slidably supported adjacent said housing;
   (b) a grinding wheel on a shaft bearing mounted on said member and rotatable in a path perpendicular to the path of the cutters,
   (c) said member being slidably movable so that said grinding wheel is movable into and out of sharpening contact with said cutting edges of said cutters,
   (d) said sharpening contact being made on a point of arc through which each cutting edge passes;
   (e) means on said chain saw adjacent said housing to slidably move said member so as to place said grinding wheel in sharpening contact with said cutting edges;
   (f) means to adjust said last means to limit the movement of said member and grinding wheel a predetermined amount;
   (g) spring means on said last means to bias said grinding wheel out of sharpening contact with said cutting edges;
   (h) and a driving wheel on said shaft driven by contact with means on said engine to rotate said grinding wheel when it is in said sharpening contact to sharpen said cutting edges,
   (i) said driving wheel being slidable with said member to be spaced from said last means when said spring means biases said grinding wheel out of said sharpening contact.

4. In an engine driven chain saw having an endless saw chain driven by a driving sprocket, cutting elements extending vertically outwardly on said chain and having outer circumferential surfaces, said cutting elements being positioned and being of such length so that their cutting edges and outer circumferential surfaces travel through an arc around said sprocket, the center of said arc being coincident with the center of said sprocket, saw chain cutting element sharpening means on said chain saw adjacent the chain driving sprocket, said sharpening means comprising:

(a) a grinding wheel on and rotatable with a shaft bearing mounted in a supporting member, said member being slidably engaged on said chain saw adjacent said engine,
(b) said grinding wheel being movable with said member so that a face thereof is positionable at a point of tangency with respect to said arc;
(c) a driving wheel on said shaft to rotate therewith;
(d) means on said engine to rotate said driving wheel,
(e) said member being pivotable to adjust said driving wheel relative to said last means on said engine to insure proper rotation of said grinding wheel;
(f) a rod having a handle on one end and having its other end connected to said member, said rod mounted for slidable movement adjacent said engine, slidable movement of said rod causing said member and grinding wheel to move toward or away from said point of tangency,
(g) said handle being spring-biased away from said point of tangency;
(h) and means to adjust said handle to limit the movement thereof a predetermined amount toward said point of tangency.

5. In a chain saw of the type having an endless saw chain driven by an engine, said engine supported in a housing; means supported on the housing to sharpen the cutting edges of the cutters on the saw chain in its path of travel during normal engine and sawing operation, said means to sharpen comprising:
(a) a member slidably supported adjacent said housing;
(b) a grinding wheel on a shaft bearing mounted on said member and rotatable in a path perpendicular to the path of the cutters,
(c) said member being slidably movable so that said grinding wheel is movable into and out of sharpening contact with said cutting edges of said cutters,
(d) said sharpening contact being made on a point of arc through which each cutting edge passes;
(e) means on said chain saw adjacent said housing to slidably move said member so as to place said grinding wheel in sharpening contact with said cutting edges;
(f) spring means on said last means to bias said grinding wheel out of sharpening contact with said cutting edges;
(g) a driving wheel on said shaft, said driving wheel having an inner disc portion;
(h) an elastomeric ring on said disc portion;
(i) and a metallic outer ring operably secured to the elastomeric ring, said outer ring being engageable with means on said engine for effecting rotation of said driving wheel and said grinding wheel for sharpening said cutting edges by said grinding wheel.

References Cited in the file of this patent
UNITED STATES PATENTS

| | | |
|---|---|---|
| 2,821,097 | Carlton | Jan. 28, 1958 |
| 2,958,240 | Segal | Nov. 1, 1960 |
| 2,986,049 | Spodobalski | May 30, 1961 |
| 3,040,602 | Carlton | June 26, 1962 |